Patented July 21, 1953

2,646,344

UNITED STATES PATENT OFFICE 2,646,344

MANUFACTURE OF BORON PHOSPHATE

Jonas Kamlet, Easton, Conn., assignor to American Potash & Chemical Corporation, Trona, Calif., a corporation of Delaware No Drawing. Application September 27, 1952, Serial No. 311,943

1 Claim. (Cl. 23—203)

This invention relates to a process for the manufacture of boron phosphate ($BPO_4$). More particularly, it relates to a simple process whereby boron phosphate may be manufactured in a single step from cheap and readily available raw materials.

Boron phosphate has heretofore been manufactured by the following methods:

(a) By the reaction of boric anhydride with phosphorus oxychloride or phosphorus pentachloride, according to the equations:

$$2B_2O_3 + 4POCl_3 \rightarrow 2BPO_4 + 2(BCl_3 \cdot POCl_3)$$
$$8B_2O_3 + 6PCl_5 \rightarrow 6BPO_4 + 10BCl_3$$

at 150°–170° C. for 8–10 hours, or by the reaction of phosphorus pentoxide with boron trichloride at 200° C. for 2–3 days (Gustavson, Berichte 3, 426 (1871), Zeit. Chem. (2) 7, 417 (1871); von Richter, Berichte 4, 976 (1872);

(b) By the reaction of boric acid with phosphoric acid, followed by a calcination to dehydrate the resultant borophosphoric acid (Vogel, Zeit. Chem. (2) 6, 125 (1870); Meyer, Berichte 22, 2919 (1889); Levi & Ghiron, Atti Accad. Lincei, 18, 394–8 (1933); or (c) By the reaction of boron trichloride with red phosphorus and air at advanced temperatures (Krol 1, Zeit. anorg. allgemein. Chemie, 102, 1–33 (1918); Journ. Chem. Soc. 114II, 109).

Boron phosphate is a white solid, melting above 1250° C., density —2.532, insoluble in hot and cold water and in all common organic solvents and not attacked by acids. Hot caustic alkali solutions or molten alkalies will slowly dissolve boron phosphate (Prescher, Acad. Pharm., 242, 194 (1904).

These properties and the high degree of chemical stability make boron phosphate suitable for use in ceramic manufacture, earthenware fabrication, for acid-resistant coatings and cements, enamelling compositions, protective coatings, as pigment in high-temperature paints, etc. Boron phosphate has also found utility in the following fields:

(a) As a catalyst in the reaction of ethylene, carbon monoxide and steam to form propionic acid (Vail, U. S. Patent 1,924,764);

(b) As a catalyst in the hydration of acetylene to acetaldehyde with steam (Horsley and Imperial Chemical Industries, British Patent 351,016);

(c) For improving the octane rating of motor fuels (N. V. de Bataafsche Petroleum Maat., British Patent 446,621);

(d) As a catalyst in the reaction of adipic acid with ammonia in the vapor phase to form adipodinitrile for the nylon process (Arnold and Lazier—U. S. Patent 2,200,734);

(e) As a catalyst in the dehydration of ethylenic and cycloaliphatic alcohols (Usines de Melle—British Patent 589,709);

(f) As a catalyst in the vapor phase methylation of benzene with dimethyl ether to form toluene (Given and Hammick, Journ. Chem. Soc. 1947, 928–935);

(g) As a catalyst in the vapor phase nitration of aromatic hydrocarbons in petroleum with $NO_2$ (Rout, U. S. Patent 2,431,585);

(h) As a catalyst in the desulfurization of hydrocarbons in petroleum refining (Krug, U. S. Patent 2,441,493);

(i) As a catalyst in the dehydration of hydroxylated oils, such as castor oil, for the manufacture of drying compositions (Rust, U. S. Patent 2,456,996);

(j) As a component of coating baths for use in the phosphatizing of ferrous metal surfaces (Gilbert—U. S. Patent 2,479,564).

I have found that boron phosphate can be made simply and in good yield by adding phosphorus pentoxide to molten boric anhydride. Boric anhydride (boron oxide—$B_2O_3$) melts at 577° C. to a clear liquid. The addition of phosphorus pentoxide, in small portions, to an agitated melt of boric anhydride, at a temperature between 577° C. and about 1000° C., causes an exothermic reaction to occur, with the formation of boron phosphate, according to the equation:

$$B_2O_3 + P_2O_5 \rightarrow 2BPO_4$$

The phosphorus pentoxide of commerce sublimes at 210°–250° C., the sublimate forming a vitreous modification which does not melt till a red heat is attained. Thus, it is highly desirable to effect this reaction under conditions which will minimize losses of phosphorus pentoxide by sublimation. The reaction may be effected in closed vessels, under atmospheric or superatmospheric pressures. The phosphorus pentoxide may be added below the surface of the molten boric anhydride, or to a well agitated melt of boric anhydride, in such a manner as to obtain most rapid and intimate contact between the reagents. The sublimed material collecting on the upper surfaces of the reaction vessel may be periodically removed and returned to the melt.

This process may be effected in any suitable acid-resistant vessel with heating elements or direct gas or oil firing. As the phosphorus pentoxide reacts with the boric anhydride, the clear melt becomes more viscous. When equimolecular proportions of the reagents have been mixed, the melt will set to a solid white mass of boron phosphate, which may then be cooled, comminuted and ground to any desired fineness. The yield of boron phosphate is usually over 95% of the theoretical.

Since this reaction is effected with molten boric anhydride, the lower limit of the reaction temperature is the melting point of boric anhydride, i. e. 577° C. The upper limit of the reaction temperature is about 1000° C., since losses of phosphorus pentoxide by sublimation become marked above that temperature.

The following example is given to define and to illustrate this invention, but in no way to limit it to the reagents, proportions or conditions described therein. Obvious modifications will occur to any person skilled in the art. All proportions given are in parts by weight.

*Example*

In a suitable, stainless steel, direct-fired reactor, melt 70 parts of boric anhydride and heat to a temperature of 600°–650° C. Add now, with good agitation, in small portions, a total of 142 parts of phosphorus pentoxide. This corresponds to one mole each of $B_2O_3$ and $P_2O_5$. When the reaction is completed, the melt is removed from the reactor and is allowed to solidify and cool in pans. The solidified melt is then fragmented mechanically and ground to a white powder of 60–100 mesh fineness, suitable for most catalyst uses and in the manufacture of ceramic compositions. For use as a pigment and in protective coatings, the $BPO_4$ should be ground to about 200 mesh. There is thus obtained a yield of 205 parts of boron phosphate, equivalent to about 96.6% of theory.

What I claim and desire to protect by Letters Patent is:

A process for the manufacture of boron phosphate which comprises reacting equimolecular proportions of boric anhydride and phosphorus pentoxide at a temperature between 577° C. and 1000° C.

JONAS KAMLET.

References Cited in the file of this patent

Mellor: "Comprehensive Treatise on Inorganic and Theoretical Chemistry, vol. 5, page 147 (1924).